United States Patent [19]

Stone

[11] 4,181,692
[45] Jan. 1, 1980

[54] COOLING TOWER FILL ASSEMBLY

[75] Inventor: Robert D. Stone, Santa Rosa, Calif.

[73] Assignee: Ecodyne Corporation, Lincolnshire, Ill.

[21] Appl. No.: 23,060

[22] Filed: Mar. 23, 1979

[51] Int. Cl.² ............................................. B01F 3/04
[52] U.S. Cl. ..................................... 261/111; 248/72; 248/228; 261/DIG. 11
[58] Field of Search .............................. 261/110–112, 261/DIG. 11, DIG. 41; 52/483, 484, 699, 714, 712; 248/221.1, 228, 72, 214, 216.1, 317

[56] References Cited

U.S. PATENT DOCUMENTS

| | | | |
|---|---|---|---|
| 3,333,835 | 8/1967 | De Flon | 261/111 |
| 3,389,895 | 6/1968 | De Flon | 261/111 |
| 3,643,931 | 2/1972 | Henning et al. | 261/111 |
| 3,647,191 | 3/1972 | Fordyce | 261/111 |
| 3,749,381 | 7/1973 | Furlong et al. | 261/111 |
| 3,799,516 | 3/1974 | Furlong et al. | 261/111 |
| 3,879,502 | 4/1975 | Furlong et al. | 261/111 |
| 4,020,130 | 4/1977 | Ovard | 261/111 |
| 4,115,484 | 9/1978 | Saxton | 261/111 |

FOREIGN PATENT DOCUMENTS

| | | |
|---|---|---|
| 1965230 | 7/1970 | Fed. Rep. of Germany ... 261/DIG. 11 |
| 106933 | 6/1917 | United Kingdom ............ 261/DIG. 11 |
| 1322291 | 7/1973 | United Kingdom ............ 261/DIG. 11 |

*Primary Examiner*—Richard L. Chiesa
*Attorney, Agent, or Firm*—Joel E. Siegel; Charles M. Kaplan

[57] ABSTRACT

Cooling tower splash fill batts are supported by a plurality of vertically and horizontally aligned grids made from vertical and horizontal wire strands. The grids occupying the same vertical plane are connected to each other by elongated generally C-shaped fill hanger splice beams.

5 Claims, 4 Drawing Figures

COOLING TOWER FILL ASSEMBLY

BACKGROUND OF THE INVENTION

This invention relates to the splash fill of mechanical or natural draft water cooling towers of the crossflow and counterflow types, and more particularly to improvements in the way such fill is suspended in grids of interconnected wire strands.

In liquid cooling towers the splash fill is usually supported by a series of wire hanger grids suspended from structural components within the tower. To facilitate manufacturing, shipping and handling, the wire grid sections are very small when compared to the large volume of a cooling tower. The small grid sections must be spliced together or else individually attached to the tower. Previously, a large number of small fastening elements, such as wire rings, had to be applied individually to splice such grids, usually at each vertical strand of each grid. In addition to requiring a large amount of hand labor in the field, such individual splices resulted in uneven load distribution, difficulty in aligning successive grids, and increased stress on the grid's corrosion resistant coatings.

SUMMARY OF THE INVENTION

Accordingly, it is an object of this invention to provide improved support for the splash fill in liquid cooling towers.

Another object is to provide a splice for vertically aligned splash fill hanger grids that permits many grids to be suspended directly from each other.

Another object is to reduce the number of splices needed to connect splash fill wire hanger grids.

Another object is to provide a splash fill grid splice that does not have to be twisted, bent, looped or otherwise manipulated to obtain a secure connection.

Another object is to eliminate stress or load concentrations when connecting splash fill wire grids.

Another object is to prevent excessive movement or shifting of cooling tower fill.

Another object is to provide a rugged, corrosion resistant, relatively low cost, easily erected liquid cooling tower fill assembly which does not possess defects found in similar prior art systems.

Other objects and advantages of the invention will be apparent from the specification and claims, and the scope of the invention will be set forth in the claims.

DESCRIPTION OF THE INVENTION

Figure 1:
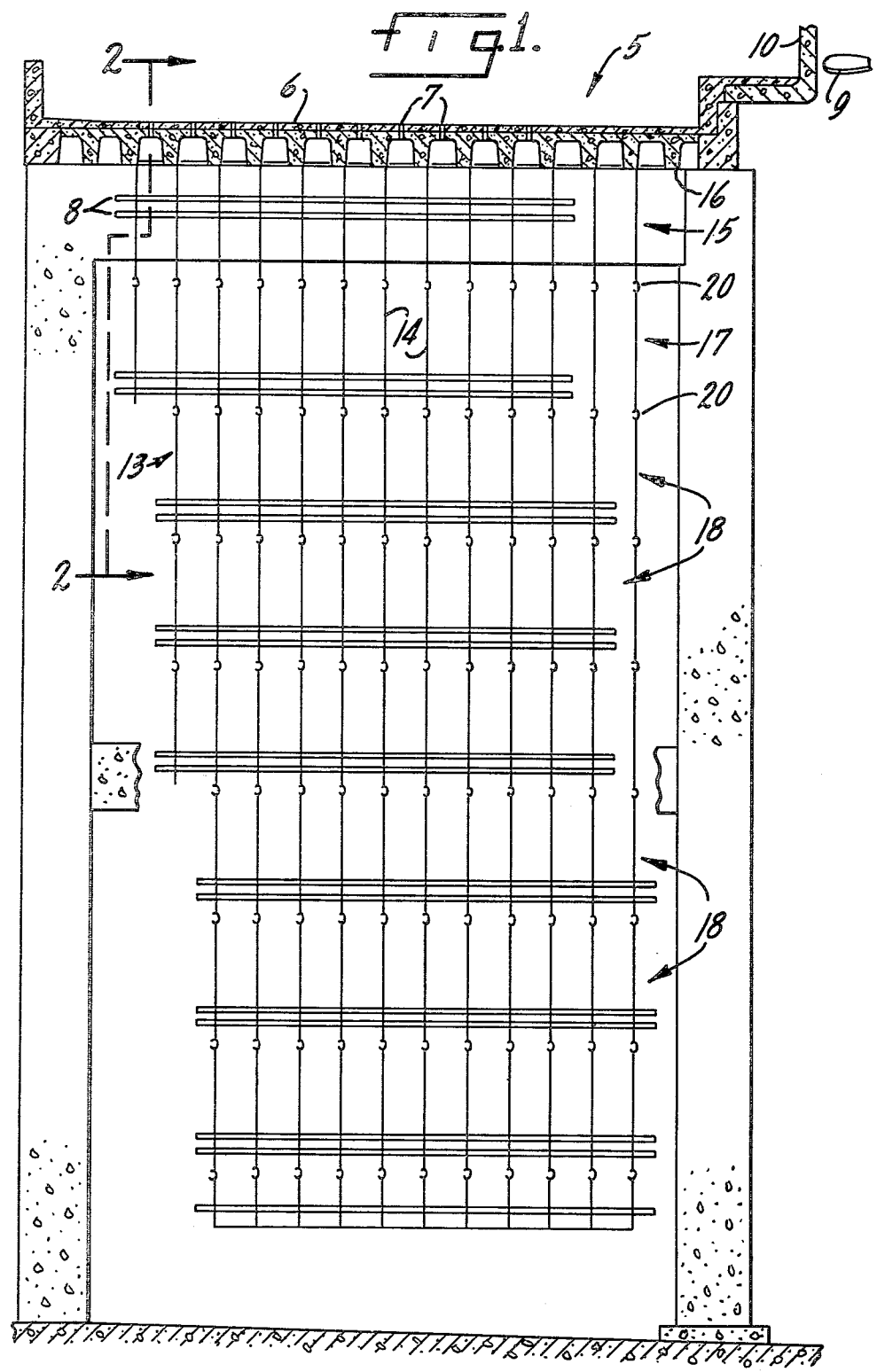
FIG. 1 is a cross sectional, partially broken-away schematic representation of a liquid cooling tower in accord with this invention.
Figure 2:
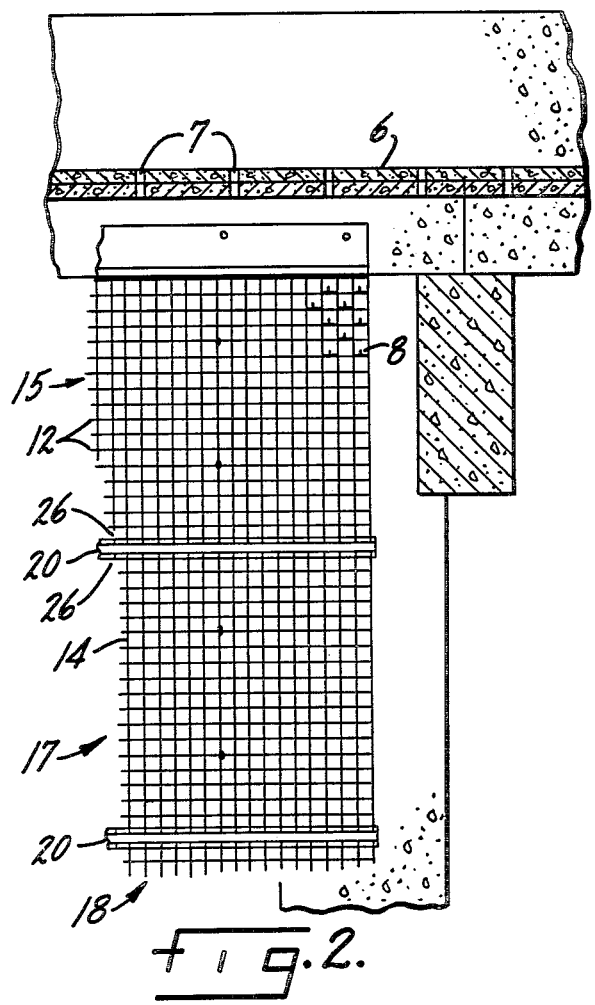
FIG. 2 is a partial sectional view taken generally along the line 2—2 in FIG. 1
Figure 4:
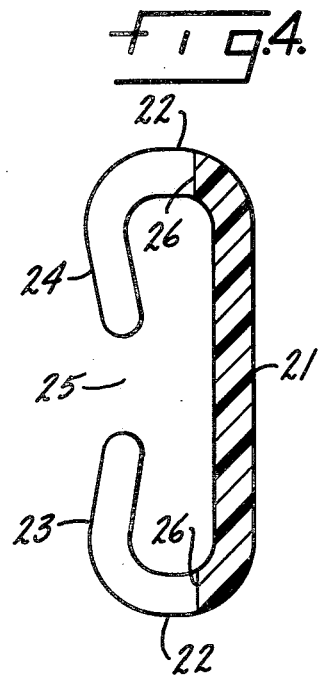
FIG. 4 is a cross sectional view taken along the line 4—4 in FIG. 3.
Figure 3:
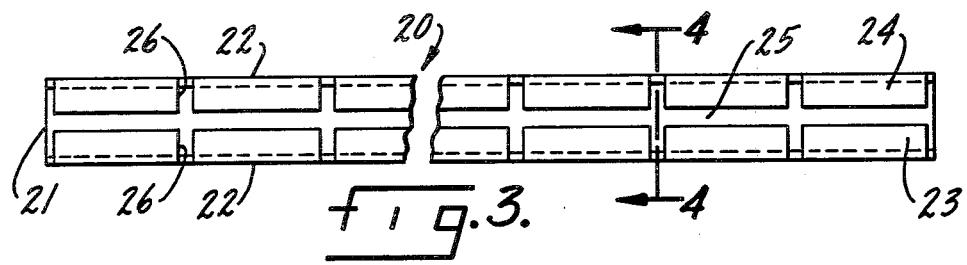
FIG. 3 is a side view of a fill hanger splice beam.

The drawing shows a portion of a conventional mechanical draft cross flow cooling tower 5 in which water to be cooled is pumped into a hot water distribution basin 6 at the top of the tower. The water then flows downwardly through nozzles or holes 7 and then through and over conventional elongated plastic splash fill members or batts 8 held in a fill support assembly in accord with this invention. Air is drawn through the splash fill and falling water by a rotatable fan 9 in a stack 10, and the cooled water is pumped from a collection basin below the fill in conventional manner.

Fill batts 8 lie on the generally horizontal, parallel, and uniformly spaced wire stands 12 of fill hanger grids 13. Strands 12 are attached to generally vertical, parallel and uniformly spaced wire strands 14 so as to form a generally uniform lattice of holes. An upper series 15 of grids 13 of generally the same size and shape is connected directly to supporting structural beam member 16 by suitable fasteners or other means (not illustrated) engaging the uppermost horizontal strand 12 of each grid. The grids 13 in upper series 15 are generally vertical and parallel and the holes defined by adjacent grids in the series are generally aligned. This permits fill batts 8 to be slid horizontally into place through the supporting grids. A lower series 17 of fill hanger grids has a plurality of generally identical, vertical parallel grids 13 which are aligned in the same vertical plane with the grids 13 in upper series 15. The uppermost horizontal strand 12 of each grid 13 in series 17 is immediately below the lowermost strand of a grid 13 in series 15. This same relationship between grids 13 occurs in other successively lower series of grids 18.

The grids in each series except for upper series 15 are connected to and supported by the lowermost horizontal strands 12 of the grids in the next higher series by a plurality of generally C-shaped fill hanger splice beams 20. Each beam 20 is a unitary elongated plastic extrusion having a continuous vertical web portion 21. Generally horizontal flanges 22 extend from the upper and lower ends of web 21. An upwardly extending leg 23 on the lower flange 22 and a downwardly extending leg 24 on the upper flange 22 terminate short of each other so as to define a horizontal slot 25 extending the full length of the beam at its center. Legs 23 and 24 are angled inwardly at about 10° to the vertical and thus occupy planes which intersect each other and which also intersect the plane of web portion 21. A plurality of vertical slits 26 are uniformly spaced along beam 20 a distance essentially equal to the uniform spacing between the vertical strands 14 of grids 13. Slits 26 pass through both flanges 22 and essentially all the way through upper and lower legs 23 and 24. The corresponding slits 26 through the upper and lower portions of beam 20 are aligned vertically.

The lowermost horizontal strand 12 of each grid in upper series 15 has been passed through the horizontal slot 25 of a splice beam 20, and the upper flange 22 of such beam is supported on such lowermost strand. The lower ends of the vertical strands of each grid in upper series 15 pass through the vertical slits 26 in legs 24 and upper flange 22. The uppermost horizontal strand 12 of each grid in the next lower series 17 of grids has also been passed through the horizontal slot 25 of a splice beam 20, and such uppermost strands 12 is received and supported by the lower flange 23 of such splice beam. The upper ends of the vertical strands 14 of the grids in lower series 17 pass through the slits in leg 23 and lower flange 22. In the same manner each successive series of grids 13 is connected to the adjacent series of grids.

It has thus been shown that by the practice of this invention, C-shaped fill hanger splice beams 20 permit each series of fill hanger grids 13 to be supported directly from the next higher series of grids. Beams 20 spread the weight they support uniformly along the uppermost and lowermost strands of each grid, so that many grids can be supported without damage to the grids in the series at or near the top of tower 5. Only one beam 20 need be used to splice each pair of aligned grids 13 in adjacent series, and the engagement of each vertical strand 14 in a slit 26 ensures that the grids 13 and batts 8 cannot shift excessively. The inward slant of legs 23 and 24 prevents strands 12 from escaping from the upper and lower bights defined by C-shaped beams 20. Drainage of liquid is promoted and ice build-up is inhibited by having slits 26 pass almost all the way through flanges 22.

While the present invention has been described with reference to a particular embodiment, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. A unitary elongated plastic generally C-shaped fill hanger splice beam for connecting vertically aligned wire grids in a liquid cooling tower, comprising: a continuous vertical web portion having generally horizontal flanges extending from its upper and lower ends, an upwardly extending leg on the lower flange and a downwardly extending leg on the upper flange, said legs terminating short of each other so as to define a horizontal slot extending the full length of said beam at its center, said legs occupying planes which intersect said vertical web, a plurality of uniformly spaced vertical slits passing through each leg and its associated flange, and the corresponding slits through the upper and lower legs and flanges being aligned vertically.

2. In a cooling tower in which air flows through splash fill within the tower in cooling relationship with a liquid falling through said fill, an improved splash fill assembly comprising:
   (a) an upper series of fill hanger grids each comprising generally parallel horizontal strands which intersect and are attached to generally parallel vertical strands so as to form a lattice of holes, the holes defined by horizontally adjacent grids in said series being generally aligned;
   (b) means connecting the upper horizontal strands in said upper series of grids to supporting structure in said cooling tower;
   (c) a lower series of said fill hanger grids in which the grids are aligned in the same vertical planes with the grids in said upper series, the grids in said lower series being immediately below the grids in said upper series;
   (d) a plurality of generally C-shaped fill hanger splice beams each comprising an elongated vertical web portion having generally horizontal flanges extending from its upper and lower ends with an upwardly extending leg on the lower flange and a downwardly extending leg on the upper flange, said legs terminating short of each other so as to define a horizontal slot extending the full length of said beam, a plurality of uniformly spaced vertical slits in each leg, the corresponding slits in the upper and lower legs being aligned vertically;
   (e) a splice beam receiving the lowermost horizontal strand of each grid in said upper series beneath the upper flange of said splice beam and being supported thereon, the lower ends of the vertical strands in said upper grid passing through said vertical slits in said upper leg, the lower flange of said splice beam receiving and supporting the uppermost horizontal strand of the vertically aligned grid in said lower series, the upper ends of the vertical strands in said lower grid passing through said vertical slits in said lower leg; and
   (f) a plurality of generally horizontal elongated splash fill members extending through said aligned holes in each series of grids and being supported on said generally horizontal strands.

3. The invention defined in claim 1, wherein said vertical slits in said upper and lower legs continue through the associated upper and lower flanges.

4. The invention defined in claim 1, wherein said upper and lower legs occupy planes which intersect said vertical web.

5. The invention defined in claim 4, wherein said planes intersect said vertical web at an angle of about ten degrees.

* * * * *